US007457980B2

(12) United States Patent
Yang et al.

(10) Patent No.: US 7,457,980 B2
(45) Date of Patent: *Nov. 25, 2008

(54) DATA REPLICATION METHOD OVER A LIMITED BANDWIDTH NETWORK BY MIRRORING PARITIES (76) Inventors: Ken Qing Yang, 35D Meadow Tree Farm Rd., Saunderstown, RI (US) 02874; John Di Pippo, 70 Pleasant St., North Kingstown, RI (US) 02852

( * ) Notice: Subject to any disclaimer, the term of this patent is extended or adjusted under 35 U.S.C. 154(b) by 301 days.

This patent is subject to a terminal disclaimer.

(21) Appl. No.: 11/017,436

(22) Filed: Dec. 20, 2004

(65) Prior Publication Data
US 2006/0036901 A1 Feb. 16, 2006

Related U.S. Application Data (63) Continuation-in-part of application No. 10/971,470, filed on Oct. 22, 2004.

(60) Provisional application No. 60/601,535, filed on Aug. 13, 2004.

(51) Int. Cl.
*G06F 11/00* (2006.01)
(52) U.S. Cl. ............................... 714/6; 714/8
(58) Field of Classification Search .................. 714/5, 714/6, 800–805
See application file for complete search history.

(56) References Cited

U.S. PATENT DOCUMENTS

| 5,297,258 A | 3/1994 | Hale et al. |
|---|---|---|
| 5,341,381 A | 8/1994 | Fuller |
| 5,418,921 A | 5/1995 | Cortney et al. |
| 5,522,032 A | 5/1996 | Franaszek et al. |
| 5,530,948 A | 6/1996 | Islam |
| 5,537,534 A | 7/1996 | Voigt et al. |
| 5,574,882 A | 11/1996 | Menon et al. |
| 5,594,862 A | 1/1997 | Winkler et al. |
| 5,640,506 A | 6/1997 | Duffy |
| 5,734,814 A | 3/1998 | Corbin et al. |
| 5,754,756 A | 5/1998 | Watanabe et al. |
| 5,754,888 A | 5/1998 | Yang et al. |
| 5,774,643 A | 6/1998 | Lubbers et al. |
| 5,964,895 A | 10/1999 | Kim et al. |

(Continued)

OTHER PUBLICATIONS

Microsoft Press Computer Dictionary, 1997, 3rd Edition, p. 107.*

*Primary Examiner*—Scott T. Baderman
*Assistant Examiner*—Paul F. Contino
(74) *Attorney, Agent, or Firm*—George N. Chaclas; Edwards Angell Palmer & Dodge LLP (57) ABSTRACT A method dramatically reduces the amount of data to be stored and transferred in a networked storage system. Preferably, the network storage system provides continued data protection through mirroring/replication, disk-to-disk backup, data archiving for future retrieval, and Information Lifecycle management (ILM). The idea is to leverage the parity computation that exists in RAID systems. By caching, transferring, and storing data parity or delta bytes of changes on a block as opposed to data block itself, substantial data reduction is possible without using sophisticated compression algorithms at the production side to minimize performance impacts upon production servers. Data can be computed using the parity/delta and previously existing data at mirror side, replication side, backup storage, or at retrieval time upon events such as failures or ILM operations.

15 Claims, 4 Drawing Sheets

U.S. PATENT DOCUMENTS

| | | | |
|---|---|---|---|
| 6,035,347 A | 3/2000 | Beardsley et al. | |
| 6,052,822 A | 4/2000 | Kim et al. | |
| 6,148,368 A | 11/2000 | DeKoning | |
| 6,173,361 B1 | 1/2001 | Taketa | |
| 6,223,301 B1 | 4/2001 | Santeler et al. | |
| 6,243,795 B1 | 6/2001 | Yang et al. | |
| 6,298,415 B1 | 10/2001 | Riedle | |
| 6,412,045 B1 | 6/2002 | DeKoning et al. | |
| 6,430,702 B1 | 8/2002 | Santeler et al. | |
| 6,460,122 B1 | 10/2002 | Otterness et al. | |
| 6,480,970 B1 | 11/2002 | DeKoning et al. | |
| 6,513,093 B1 * | 1/2003 | Chen et al. | 711/4 |
| 6,516,380 B2 | 2/2003 | Kenchammmana-Hoskote et al. | |
| 6,523,087 B2 | 2/2003 | Busser | |
| 6,542,960 B1 | 4/2003 | Wong et al. | |
| 6,553,511 B1 | 4/2003 | DeKoning et al. | |
| 6,606,629 B1 | 8/2003 | DeKoning et al. | |
| 6,711,703 B2 | 3/2004 | MacLaren et al. | |
| 6,715,116 B2 | 3/2004 | Lester et al. | |
| 6,725,392 B1 * | 4/2004 | Frey et al. | 714/6 |
| 6,851,082 B1 * | 2/2005 | Corbett | 714/770 |
| 7,152,146 B2 * | 12/2006 | Satoyama et al. | 711/162 |
| 2002/0103983 A1 | 8/2002 | Rege et al. | |
| 2003/0221064 A1 * | 11/2003 | Honda et al. | 711/114 |
| 2004/0088485 A1 * | 5/2004 | Shang | 711/114 |
| 2004/0117374 A1 | 6/2004 | Hung | |

* cited by examiner

DATA REPLICATION METHOD OVER A LIMITED BANDWIDTH NETWORK BY MIRRORING PARITIES

CROSS-REFERENCE TO RELATED APPLICATION

This application claims priority to U.S. Provisional Patent Application No. 60/601,535, filed Aug. 13, 2004, which is incorporated herein by reference. This application is also a continuation-in-part of U.S. patent application Ser. No. 10/971,470 filed Oct. 22, 2004, which is incorporated herein by reference.

BACKGROUND OF THE INVENTION

1. Field of the Invention

The subject disclosure relates to methods and systems for archiving, mirroring/replicating, or backing up information in a limited bandwidth distributed computing network, and more particularly to replicating/mirroring data while minimizing communication traffic and without impacting application performance in a redundant array of independent disks (RAID) array.

2. Background of the Related Art

Remote data replication or archiving data has become increasingly important as organizations and businesses depend more and more on digital information. Loss of data at the primary storage site, for any reason, has become an unacceptable business risk in the information age. Since the tragic events of Sep. 11, 2001, replicating data to a remote storage back-up site has taken on new urgency as a result of heightened awareness of business resiliency requirements. Remote data replication is widely deployed in industry as varied as finance, legal and other corporate settings for tolerating primary failures and disaster recovery. Consequently, many products have been developed to provide remote replication or mirroring of data.

One type of remote replication product is block-level remote mirroring for data storage in fiber channel storage area networks (FC-SAN). Block-level remote mirroring is typically done through dedicated or leased network connections (e.g., WAN connection) and managed on a storage area network based on FC-SAN. EMC Corporaton of Hopkinton, Mass. offers such a product know as the Symmetrix Remote Data Facility In particular, use of RAID disk drives has also been widely used to reliably store data for recovery upon failure of the primary storage system. However, replicating data to a geographically remote site demands high network bandwidth on a wide area network (WAN). It is well-known that high bandwidth WAN connections such as leased lines of tens or hundreds of megabytes are very costly. As such, use of such communication networks is limited to companies that can afford the expense. In order to enable remote data replication over commodity Internet connections, a number of technologies have emerged in the storage market. These technologies can be generally classified into three categories: WAN acceleration using data compressions; backup changed data blocks (delta-blocks); and backup changed bytes using byte-patching techniques.

Compression attempts to maximize data density resulting in smaller amounts of data to be transferred over networks. There are many successful compression algorithms including both lossless and lossy compressions. Compression ratio ranges from 2 to 20 depending on the patterns of data to be compressed. While compression can reduce network traffic to a large extent, the actual compression ratio depends greatly on the specific application and the specific file types. Although relative lightweight real-time compression algorithms have had great success in recent years, there are factors working against compression algorithms as a universal panacea for data storage. These factors include high computational cost, high latency, application or file system dependency, and limited compression ratio for lossless data compression. There are also technologies that replicate or mirror changed data in a file reducing network traffic. These technologies work at a file system level. The draw back of technologies working at the file server level is that they are server intrusive because installation is required in the file system of the server. As a result, the limited resources of the server (such as CPU, RAM, and buses that are needed to run applications) are consumed. In addition, such file system level technologies are file system dependent.

Mirroring changed data blocks (i.e. delta-blocks) reduces the network traffic because only changed blocks are replicated over the network. Patching techniques find the changed data between the old version and the new version of a file by performing a bit-wise exclusive OR operation. While these approaches can reduce network traffic, significant overhead is incurred while collecting the changes. To back up changed data blocks, the system has to keep track of meta-data and to collect changed blocks from disks upon replication. To back up changed bytes of a file, a process of generating a patch and comparing the new file with the old file, has to be initiated upon replication. The generation and comparison process takes a significant amount of time due to slow disk operations. Therefore, these technologies are generally used for periodical backups rather than real-time remote mirroring. The recovery time objective (RTO) and recovery point objective (RPO) are highly dependent on the backup intervals. If the interval is too large, the RPO becomes large increasing the chance of losing business data. If the interval is too small, delta collection overheads increase drastically slowing down application performance significantly.

The lower cost solutions also tend to have limited bandwidth and less demanding replication requirements. For example, the lower cost solutions are based on file system level data replication at predetermined time intervals such as daily. During replication, a specialized backup application program is invoked to collect file changes and transfer the changes to a remote site. Typically, the changes may be identified by review of file meta data to identify modified files. The modified files are then transmitted to the server program through TCP/IP socket so that the server program can update the changes in the backup file. It can be seen that such approaches are more efficient than backing up every file. However, data is vulnerable between scheduled backups and the backups themselves take an undesirably long amount of time to complete.

Several following examples, each of which is incorporated herein by reference in its entirety, disclose various approaches to parity computation in a disk array. U.S. Pat. No. 5,341,381 has a parity cache to cache RRR-parity (remaining redundancy row parity) to reduce disk operations for parity computation in a RAID. U.S. Pat. No. 6,523,087 caches parity and checks for each write operation to determine if the new write is within the same stripe to make use of the cached parity. U.S. Pat. No. 6,298,415 caches sectors and calculates parity of the sectors in a strip in cache and reads from disks only those sectors not in cache thereby reducing disk operations. These prior art technologies try to minimize computation cost in a RAID system but do not solve the problem of communication cost for data replication across computer networks. U.S. Pat. No. 6,480,970 presents a method for speeding up the process of verifying and checking of data consistency between two mirrored storages located geographically remote places by transferring only a meta data structure and time stamp as opposed to data block itself. Although this prior art method aims at verifying and checking data consistency between mirrored storages, it does not consider solving efficiently transferring data over a network with limited bandwidth for data replication and remote mirroring.

In view of the above, a need exists for a method and system that mirrors, replicates and archives data in real-time while minimizing the burden on the communication lines between the primary storage site and the mirror storage facility.

SUMMARY OF THE INVENTION

The present disclosure is directed to a storage architecture for mirroring data including a network and a primary storage system for serving storage requests. The primary storage system has a central processing unit and a random access memory operatively connected to the CPU. The random access memory is segmented into a parity cache and a mirroring cache for storing a difference between an old parity and a new parity of each data block until the difference is mirrored to a remote site. The storage architecture also includes a parity computation engine (that may be a part of a RAID controller if the underlying storage is a RAID) for determining the difference. A mirror storage system is in communication with the primary storage system via the network, wherein the mirror storage system provides a mirroring storage for the primary storage system for data recovery and business continuity.

The present disclosure is further directed to the mirror storage system having a CPU and a RAM segmented into a data cache, a mirroring cache, a parity cache, a log disk and a parity computation engine.

Still another embodiment of the present disclosure is a method for asynchronous and real-time remote mirroring of data to a remote storage through a limited bandwidth network connection including the steps of calculating a difference between an old parity and a new parity of a data block being changed, mirroring the difference to the remote site whenever bandwidth is available, and generating new parity and, thereby, new data based upon the difference, old data and old parity data.

It is one object of the disclosure to leverage the fact that a RAID storage system performs parity computation on each write operation, by mirroring only the delta_parity to reduce the amount of data transferred over a network, making it possible to do real-time, asynchronous mirroring over limited bandwidth network connections.

It is another object of the disclosure to leverage RAID storage's parity computation on each write operation by mirroring only the difference of successive parities on a data block, e.g., a delta_parity. By mirroring only the delta_parity, the amount of data that needs to be transmitted over the network is efficiently reduced. It is another object of the disclosure to utilize the parity computation that is a necessary step in a RAID storage, therefore, little or no additional computation is needed to perform the parity mirroring at the primary storage side. As a benefit, performance of application servers in accessing the primary storage are not impacted by the mirroring process.

It is still another object of the disclosure to provide a system that can perform real-time, asynchronous mirroring over limited bandwidth network connections. It is a further object of the subject disclosure to provide an application and file system for archiving data that is system independent. Preferably, the application and file system has no significant impact upon application servers so that resources can be used efficiently.

A storage architecture provides efficient remote mirroring of data in RAID storage or like to a remote storage through a network connection. The storage architecture mirrors only a delta_parity whenever possible. A parity cache keeps the delta_parity of each data block until the block is mirrored to the remote site. Whenever network bandwidth is available, the parity cache performs a cache operation to mirror the delta_parity to the remote site. If a cache miss occurs, i.e. the delta_parity is not found in the parity cache, computation of the data parity creates the delta_parity. For RAID architectures, parity computation is a necessary step for every write operation. Thus, no additional operation is needed to compute the delta_parity for mirroring at the primary storage site. At the remote site, the delta_parity is used to generate the new parity and the new data using the old data and parity and, in turn, WAN traffic is substantially reduced.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings.

DETAILED DESCRIPTION OF PREFERRED EMBODIMENTS

The present invention overcomes many of the prior art problems associated with remote replication of data. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Figure 1:
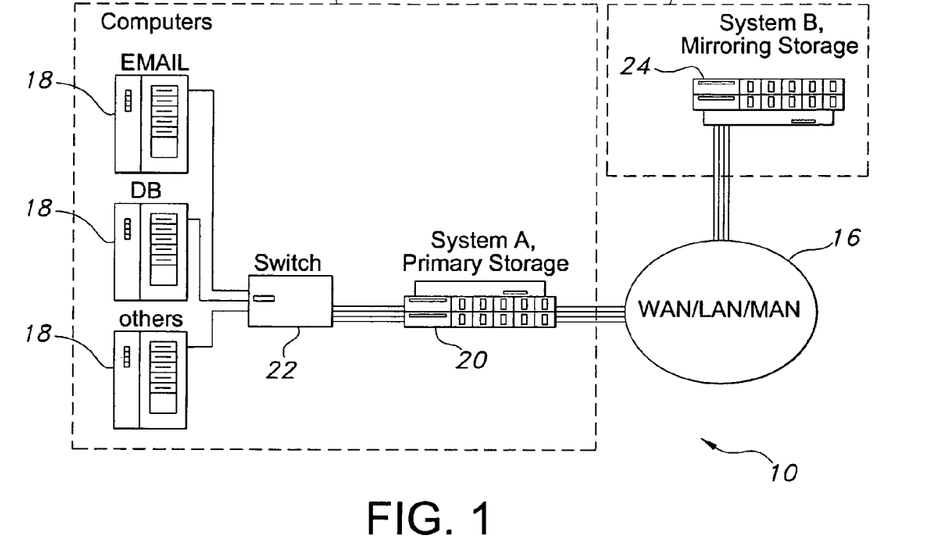
FIG. 1 is a somewhat schematic diagram of an environment utilizing an archiving method in accordance with the subject disclosure.

Referring now to the FIG. 1, there is shown a schematic diagram of an environment 10 that implements the archiving methodology of the present disclosure. The archiving methodology is a real-time, asynchronous mirroring that is particularly useful over low bandwidth network connections. The following discussion describes the components of such a environment 10.

The environment 10 has a primary location 12 connected with a remote backup location 14 by a network 16. In the preferred embodiment, the network 16 is a WAN with limited bandwidth. The primary location 12 is a company or other entity that desires remote data replication. Preferably, the backup location 14 is distanced from the primary location 12 so that a single event would not typically impact operation at both locations 12, 14.

At the primary location 12, the company establishes a LAN/SAN with an Ethernet, Fibre Channel or the like architecture. The primary location 12 includes one or more servers 18 within the LAN/SAN for conducting the operations of the company. In a typical company, the servers 18 would provide electronic mail, information storage in databases, execute a plurality of software applications and the like. Company users interact with the servers 12 via client computers (not shown) in a well-known manner. In a preferred embodiment, the client computers include desktop computers, laptop computers, personal digital assistants, cellular telephones and the like.

The servers 18 communicate with a primary storage system 20 via an Ethernet/FC switch 22. For clarity, three servers 18 are shown but it is appreciated that any number of servers 18 may meet the needs of the company. The servers 18 are any of a number of servers known to those skilled in the art that are intended to be operably connected to a network so as to operably link to a plurality of clients, the primary storage system 20 and other desired components. Although identified as an Ethernet/FC switch 22, it is envisioned that the switch 22 may be any of a plurality of network and like switches known to those of ordinary skill in the pertinent art. The primary storage 20 is shared by the servers 18 as a data storage system, controller, appliance, concentrator and the like. The primary storage system 20 accepts storage requests from the servers 18, reads to and writes from the servers 18, serves storage requests and provides mirroring functionality in accordance with the subject disclosure.

The primary storage system 20 communicates with mirror storage system 24 via the network 16. In order to maintain remote replication of the primary storage system 20, the primary storage system 20 sends mirroring packets to the mirror storage system 24. The mirroring storage system 24 provides an off site mirroring storage at block level for data recovery and business continuity. In a preferred embodiment, the mirror storage system 24 has a similar architecture to the primary storage system 20 but performs the inverse operations of receiving mirroring packets from the primary storage system 20. As discussed in more detail below with respect to FIG. 3, the mirror storage system 24 interprets the mirroring packets to remotely replicate the information on the primary storage system 20.

Figure 2:
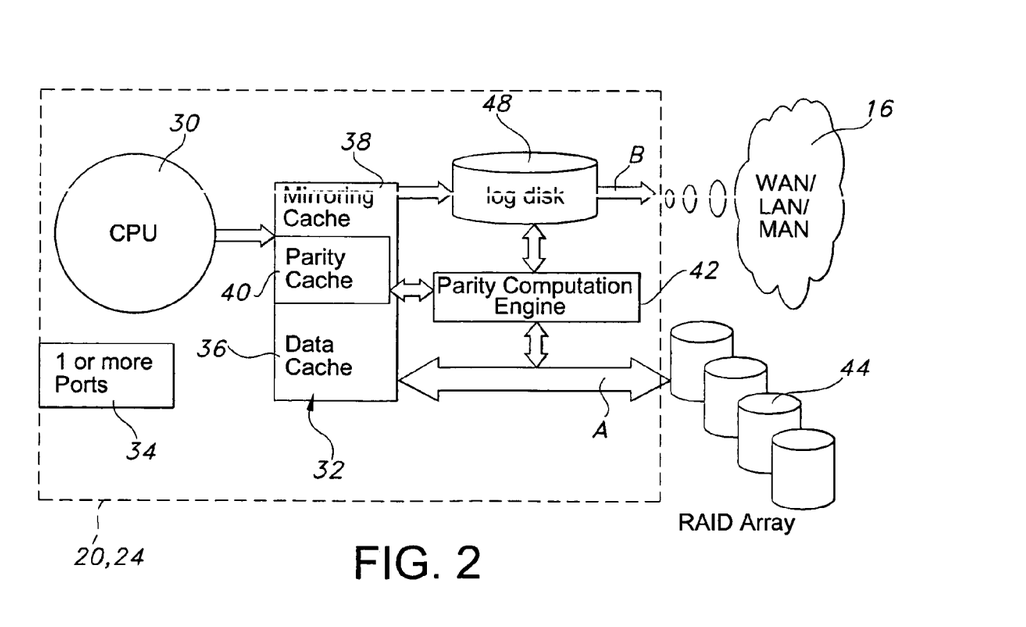
FIG. 2 is a block diagram of a storage server within the environment of FIG. 1.

FIG. 2 illustrates an exemplary configuration of a storage unit system that is suitable for use as both the primary storage system 20 and mirror storage system 24. Each system 20, 24 typically includes a central processing unit (CPU) 30 including one or more microprocessors such as those manufactured by Intel or AMD in communication with random access memory (RAM) 32. Each system 20, 24 also includes mechanisms and structures for performing I/O operations such as, without limitation, a plurality of ports 34, network and otherwise. A storage medium 48 such as a magnetic hard disk drive within the system 20, 24 typically stores cached data or parity in a log structured format as a second level cache. Further, a storage medium (not explicitly shown) such as magnetic hard disk drives within the system 20, 24 typically stores an operating system for execution on the CPU 30. The storage medium may also be used for general system operations such as storing data, client applications and the like utilized by various applications. For example, hard disk drives provide booting for the operating system, and paging and swapping between the hard disk drives and the RAM 32.

For the primary storage system 20 and the mirror storage system 24, the RAM 32 is segmented into three cache memories: a data cache 36, a mirroring cache 38, and a parity cache 40 as shown in FIG. 2. The data cache 36 performs as a traditional cache for data storage and transfer of data to the RAID array 44. The mirroring cache 38 and parity cache 40 are differently utilized as described in detail below. Each system 20, 24 also includes a parity computation engine 42 in communication with the RAM 32 for conducting the necessary operations for the subject methodology. As denoted by arrows A, B, respectively, each system 20, 24 is operatively connected to a RAID array 44 and the network 16.

Figure 3:
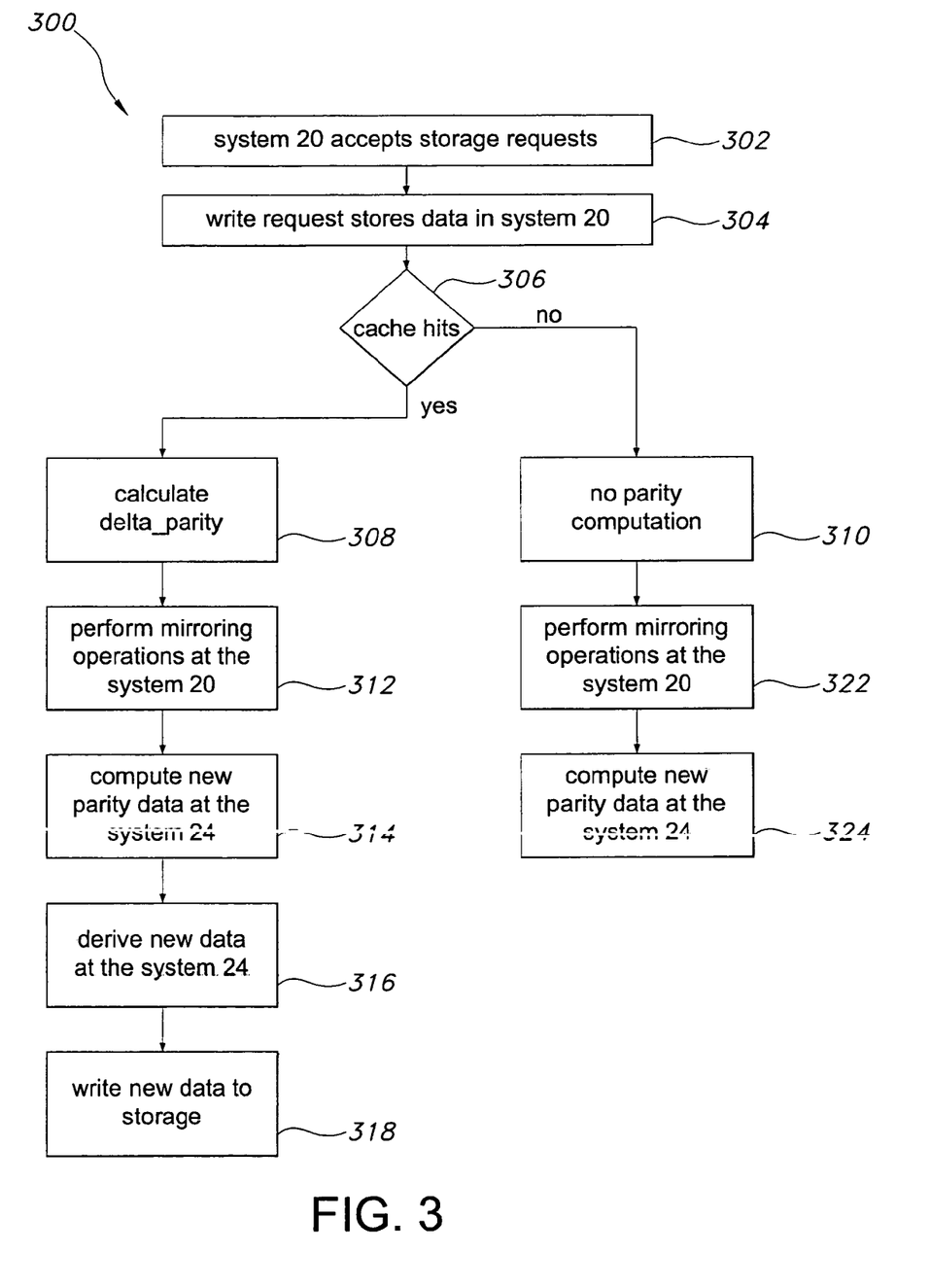
FIG. 3 is a flowchart depicting a method for remotely replicating information in the environment of FIG. 1.

Referring now to FIG. 3, there is illustrated a flowchart 300 depicting a method for remotely replicating information across a low bandwidth WAN 16. During operation, storage unit system A accepts storage requests, read or writes from the computers that share the storage and serves these storage requests at step 302. At step 304, a write request occurs. In response to the write request, data is cached in two places, the mirroring cache 38 and the data cache 36 of storage unit system A.

At step 306, the parity computation engine 42 of the primary storage system 20 determines if the old data with the same logical block address (LBA) is in the mirroring cache 38 or the data cache 36 of storage unit system A (e.g., a cache hit). If a cache hit occurs, the method 300 proceeds to step 308. If not, the method proceeds to step 310.

At step 308, the parity computation engine 42 computes the new parity as is done in a RAID storage system. The delta_parity is the difference between the newly computed parity and the old parity or the difference between the new data and the old data of the same LBA. The delta_parity is stored in the parity cache 40 associated with the corresponding LBA.

Preferably, the parity computation engine 42 performs the same parity computation upon a write back or destaging operation between the data cache 36 and the underlying storage 44 (e.g., RAID array), wherein the parity cache 40 is updated accordingly by writing the new parity and the delta_parity thereto. Additionally, whenever the primary storage system 20 is idle, a background parity computation may be performed for changed or dirty blocks in the data cache 36, and the parity cache 40 can be updated accordingly by writing the new parity and the delta_parity to the parity cache 40.

At step 312, the primary storage system 20 performs mirroring operations. In a preferred embodiment, the mirroring operations are performed when the network bandwidth is available. The primary storage system 20 performs mirroring operations by looking up the parity cache using the LBAs of data blocks cached in the mirroring cache 38 and sending the delta_parity to the mirror storage system 24 if a cache hit occurs. If it is a cache miss, the data will be mirrored to the remote site. After mirroring the delta_parity/data, the method 300 proceeds to step 314 which occurs at the mirror storage system 24 where inverse operations as that of the primary storage system 20 are performed. At step 314, the mirror storage system 24 computes new parity data based upon the delta_parity/data received from the primary storage system 20.

At step 316, the mirror storage system 24 derives the new or changed data by using the input received from the primary storage system 20, the old data and the old parity existing in its data cache 36 and parity cache 40, or in its RAID array. The computation of the new data preferably uses the EX-OR function in either software or hardware. At step 318, the new data is written into the data cache 36 of the mirror storage system 24 according to its LBA and similarly the parity data is stored in the parity cache 40 according to its corresponding LBA.

At step 310, if the old data with the same LBA is not in the caches (e.g., a cache miss), the parity computation is done in the same way as in RAID storages. However, this computation may be delayed if the system is busy. If the parity computation is done, the parity will be cached in the parity cache. At step 322, the primary storage system 20 performs mirroring operations sending the data in the mirroring cache 38 to the mirror storage system 24. At step 324, the mirror storage system 24 computes new parity data based upon the mirroring cache data received from the primary storage system 20.

In view of the above method 300, it can be seen that a write operation that does not change an entire block, can advantageously be mirrored to a mirror storage system 24 without transmitting a large amount of data, rather just the delta_parity is transmitted. This is a common occurrence such as in: banking transactions where only the balance attribute is changed among a block of information related to the customer such as name, SSN, address; a student record change in People Soft's academic transactions after the final exam, only the final grade attribute is changed while all other information regarding the student stays the same; addition or deletion of an item in an inventory database in a warehouse, only the quantity attribute is changed while all other information about the added/deleted product keeps the same; update a cell phone bill upon occurrence of every call placed; record a lottery number upon purchase; and a development project changes that adds to a large software package from time to time, these changes or additions represent a very small percentage of the total code space.

In these and like situations, the typical block size is between 4 kbytes and 128 kbytes but only a few bytes of the data block are changed. The delta_parity block contains only a few bytes of nonzero bits and all other bits are zeros so the delta_parity block can be simply and efficiently compressed and/or transferred. Typically, achievable traffic reductions can be 2 to 3 orders of magnitude without using complicated compression algorithms. For example, by just transferring the length of consecutive zero bits and the few nonzero bytes reflecting the change of the parity, substantial reductions in network traffic result. Moreover, in RAID systems, the necessary computations are available so the method 300 incurs no or little additional overhead for mirroring purposes. Still further, by preferably using the parity cache 40, the mirroring process is also very fast compared to existing approaches.

Figure 4:
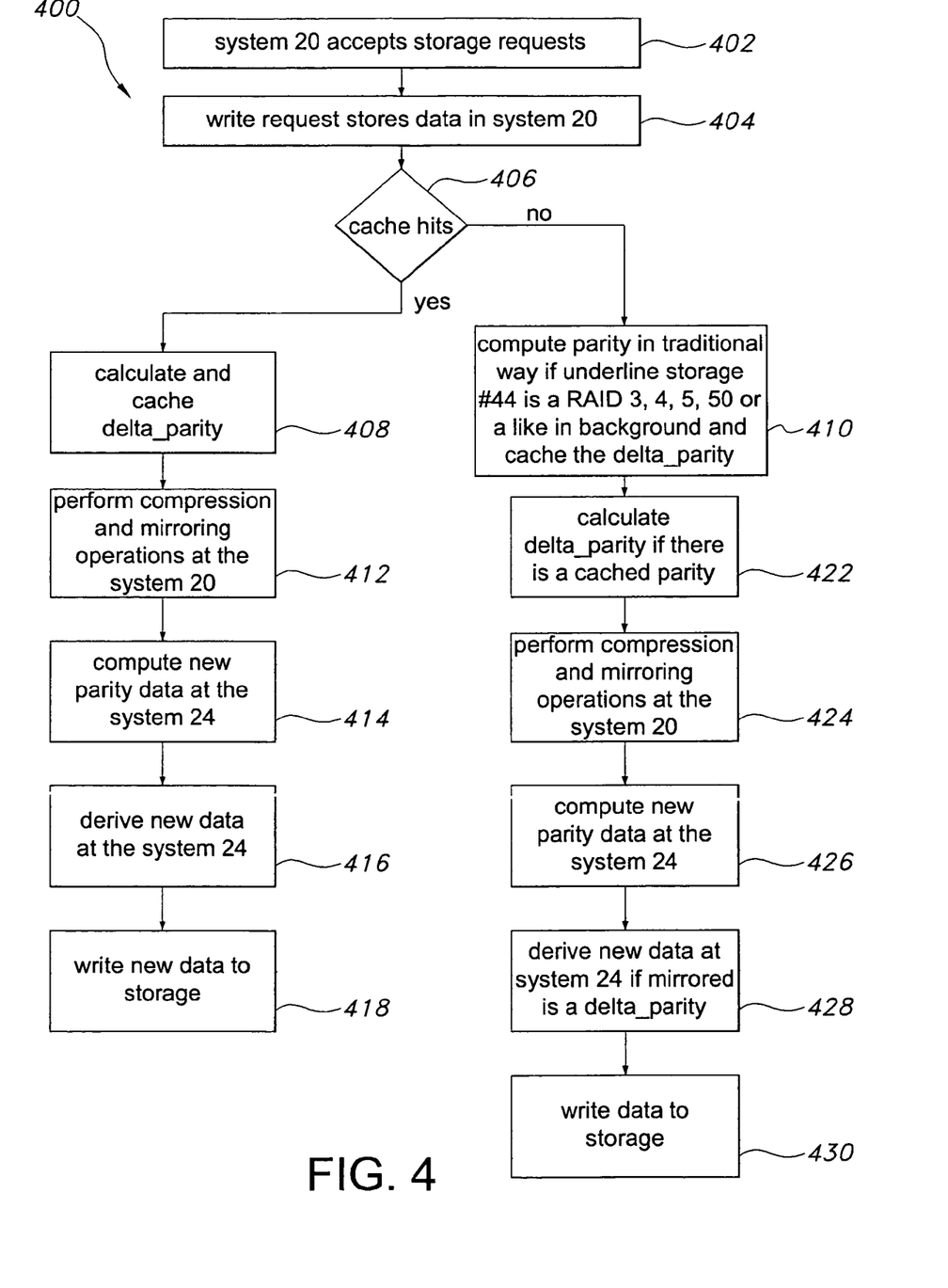
FIG. 4 is another flowchart depicting a method for remotely replicating information in the environment of FIG. 1.

Referring now to FIG. 4, there is illustrated a flowchart 400 depicting another method for remotely replicating information across a low bandwidth WAN 16. During operation, storage unit system A accepts storage requests, read or writes from the computers that share the storage and serves these storage requests at step 402. At step 404, a write request occurs. In response to the write request, data is cached in two places, the mirroring cache 38 and the data cache 36 of storage unit system A.

At step 406, the parity computation engine 42 of the primary storage system 20 determines if the old data with the same logical block address (LBA) is in the mirroring cache 38 or the data cache 36 of storage unit system A (e.g., a cache hit). If a cache hit occurs, the method 400 proceeds to step 408. If not, the method proceeds to step 410.

At step 408, the parity computation engine 42 computes the new parity as is done in a RAID storage system, or alternatively computes the delta_parity by EX-Oring the new data with the old data with the same LBA. The delta_parity is the difference between the newly computed parity and the old parity or the difference between the new data and the old data of the same LBA. The delta_parity is stored in the parity cache 40 associated with the corresponding LBA and the mirroring cache 38.

Preferably, the parity computation engine 42 performs the same parity computation upon a write back or destaging operation between the data cache 36 and the underlying storage 44 (e.g., RAID array), wherein the parity cache 40 is updated accordingly by writing the new parity and the delta_parity thereto. Additionally, whenever the primary storage system 20 is idle, a background parity computation may be performed for changed or dirty blocks in the data cache 36, and the parity cache 40 can be updated accordingly by writing the new parity and the delta_parity to the parity cache 40.

At step 412, the primary storage system 20 performs mirroring operations. In a preferred embodiment, the mirroring operations are performed when the network bandwidth is available. The primary storage system 20 performs mirroring operations by looking up the parity cache by using the LBAs of data blocks cached in the mirroring cache 38 and sending the delta_parity to the mirror storage system 24 if a cache hit occurs. If it is a cache miss, the data will be mirrored to the remote site. Data compression is preferably performed before the mirroring operations. After mirroring the delta_parity/data, the method 300 proceeds to step 314 which occurs at the mirror storage system 24 where inverse operations as that of the primary storage system 20 are performed. At step 414, the mirror storage system 24 computes new parity based upon the delta_parity/data received from the primary storage system 20.

At step 416, the mirror storage system 24 derives the new or changed data by using the input received from the primary storage system 20, the old data and the old parity existing in its data cache 36 and parity cache 40, or in its RAID array. The computation of the new data preferably uses the EX-OR function in either software or hardware. At step 418, the new data is written into the data cache 36 of the mirror storage system 24 according to its LBA and similarly the parity is stored in the parity cache 40 according to its corresponding LBA.

At step 410, if the old data with the same LBA is not in the caches (e.g., a cache miss), the parity computation is done in the same way as in RAID storages. It is envisioned that the RAID may be RAID 3, 4, 5, 50 or a like method. This computation may be delayed if the system is busy. If the parity computation is done, the parity will be cached in the parity cache. At step 322, the delta_parity computation is performed if there is a cached parity. At step 324, the primary storage system 20 performs compression and mirroring operations sending the data in the mirroring cache 38 to the mirror storage system 24. At step 326, the mirror storage system 24 computes new parity data based upon the mirroring cache data received from the primary storage system 20 and the method 400 proceeds to step 428. At step 428, new data is derived at system 24 if a delta_parity is mirrored. At step 430, the new data is written for storage.

Figure 5:
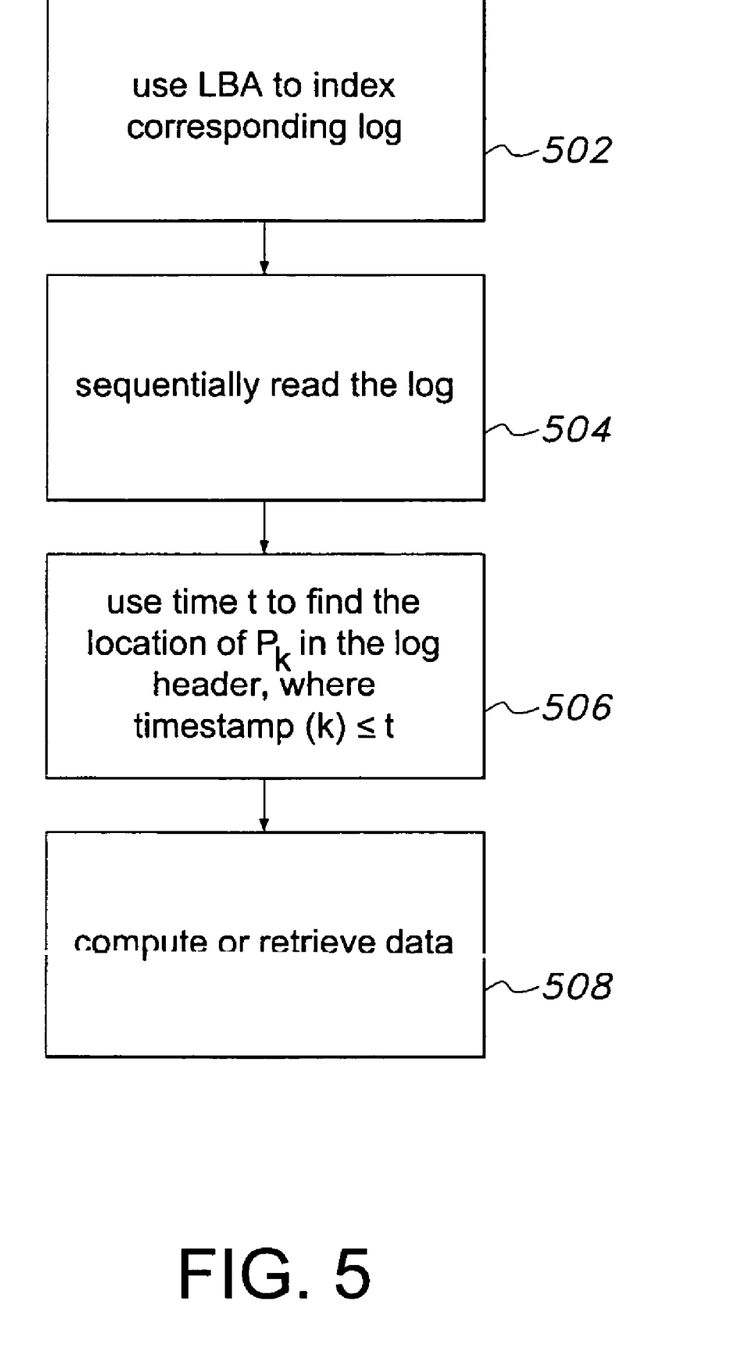
FIG. 5 is a flowchart depicting a method for logging data in the environment of FIG. 1.

Referring now to FIG. 5, there is illustrated a flowchart 500 depicting a method for retrieving data from a log of storage activity. To create the log, ILM storage operations occur that archive data in time order and retrieve data for a given time point t. At the primary storage system 20, for a sequence of writes to a data block, delta_parities are recorded in a log structure together and intermixed with delta_parities of other data blocks. Preferably, the storage is within the log disk 48. The objective is to form a large log(s) quickly and move the log(s) to the cache disk quickly so that the RAM 32 is immediately available to cache additional writes. The log is transferred to the secondary storage system 24 whenever the WAN 16 is available. Upon receiving the log, the secondary storage system 24 interprets the log and forms new logs. Each one of the new logs contains a time-ordered sequence of delta_parity corresponding to one LBA. The log is headed by a log header and the original data block at one end and tailed by the newest data block at the other end of the log.

Referring in detail to FIG. 5, in order to retrieve all data up to time t, the flowchart 500 begins at step 502 where the secondary storage system 24 uses LBA to index a corresponding log. At step 504, the secondary storage system 24 sequentially reads the log out according to formula (1) below $$\text{Log}_{LBA(A)} = A_0^{old} P_1 P_2 P_3 \ldots P_k \ldots P_N A_N^{new} \quad \text{formula (1)}$$

where A is a data block that has been changed for N times in the past with beginning value of $A_0^{old}$ and ending value of $A_N^{new}$, $P_i$ is the i-th delta parity of A in time sequence, and $\text{Log}_{LBA(A)}$ denotes the logical block address of A.

At step 506, the secondary storage system 24 uses the time t to find the location of $P_k$ in the log header, where k is chosen in such a way that timestamp(k)<=t. At step 508, the secondary storage system 24 computes the data according to formula (2) below $$\begin{aligned}
&\text{If } k <= N/2 \\
&A_k^{new} = A_0^{old} \otimes P_1 \otimes P_2 \otimes P_3 \ldots \otimes P_k \\
&\text{Else} \\
&A_k^{new} = P_k \otimes P_{k+1} \otimes P_{k+2} \ldots \otimes P_N \otimes A_N^{new}
\end{aligned} \quad \text{formula (2)}$$

where N is the number of delta parities in the log.

As can be seen, the mirror storage system 24 can be one of several types. In one embodiment, the mirror storage system 24 is mirror/replication storage for storing the mirror image of the data at the primary storage system 20 for fast data recovery and business continuity. As soon as the mirroring log is received from the primary storage system 20, data is immediately computed based on the delta-parity in the received mirroring log. Computed data will be stored according to their LBAs in the secondary storage. In another embodiment, the mirror storage system 24 is a disk-to-disk backup storage for, instead of computing back the data immediately using the delta-parity, storing the compressed delta-parity and postponing the data computation to the time when recovery is necessary. In this way, not only network bandwidth requirement is reduced, but also the storage space requirement is reduced for backup data in disks. Upon recovery, data can be easily and efficiently computed using EX-OR functions. In still another embodiment, the mirror storage system 24 is an archiving/ILM storage for storing changed data with associated time stamps. In this case, the mirror storage system 24 stores both data and delta_parity. Whenever possible, delta_parity is compressed for the purpose of saving storage space. Upon receiving a mirroring log, delta-parity corresponding to a same LBA is collected to form a large log in the order of timestamps of write operations. The logs will be stored in the secondary storage sequentially and indexed by the corresponding LBA. Such ordering and logging optimizes read operation upon data retrieval in the future.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation. While the invention has been described with respect to preferred embodiments, those skilled in the art will readily appreciate that various changes and/or modifications can be made to the invention without departing from the spirit or scope of the invention as defined by the appended claims.

What is claimed is:

1. A storage architecture for mirroring data comprising:
   (a) a network;
   (b) a primary storage system for serving storage requests and storing data blocks, wherein the primary storage system has
      i) a central processing unit (CPU),
      ii) a random access memory (RAM) operatively connected to the CPU and segmented into a parity cache for storing a difference between an old parity and a new parity of each data block until the difference is mirrored to a remote site,
      iii) a log-structured disk as a secondary level mirroring cache, and
      iv) a parity computation engine for determing the difference; and
   (c) a mirror storage system in communication with the primary storage system via the network, wherein the mirror storage system provides data mirroring storage for the primary storage system for data recovery and business continuity, wherein the mirror storage system derives and stores a mirrored copy of data of the primary storage system that is computed based on the difference transferred from the primary storage system.

2. A storage architecture as recited in claim 1, wherein the primary storage system has the RAM further segmented into a data cache and a mirroring cache.

3. A storage architecture as recited in claim 2, wherein the log-structured disk and the RAM form a two level hierarchical cache that caches data and delta_parity if computed.

4. A storage architecture as recited in claim 3, wherein upon a write operation, the RAM collects written data blocks as well as delta_parities of the written data blocks, if the delta_parities are computed, to form a log to be sequentially written into the log-structured disk.

5. A storage architecture as recited in claim 4, wherein the log-structured disk contains a header with meta-information about the log and a plurality of entries selected from the group consisting of data blocks with associated meta-information and delta_parities of data blocks with associated meta-information, each entry having a flag to indicate whether the entry is a data block or a delta_parity.

6. A storage architecture for data mirroring/replication, disk-to-disk backup, archiving, or ILM (information lifecycle management) comprising:
   (a) a network;
   (b) a primary storage system for serving storage requests and storing data blocks, wherein the primary storage system has
      i) a central processing unit (CPU),
      ii) a random access memory (RAM) operatively connected to the CPU and segmented into a parity cache for storing a difference between an old parity and a new parity of each data block until the difference is replicated to a remote site, stored in an archiving storage, or moved to an ILM storage, and iii) a parity computation engine for determining the difference; and (c) a secondary storage system in communication with the primary storage system via the network, wherein the secondary storage system provides data mirroring storage for the primary storage system for data recovery and business continuity, a backup storage, archiving storage, or ILM storage, wherein the secondary storage system stores mirrored copy of data of the primary storage or a delta-parity of changed data blocks for saving storage space, wherein the secondary storage system is a disk-to-disk backup and data stored thereon is either directly mirrored from the primary storage system or computed based on the difference when transferred from the primary storage system such that the difference can be used to recompute data back upon retrieval using successive EX-OR functions.

7. A storage architecture as recited in claim 6, wherein the primary storage system has the RAM further segmented into a data cache, the primary storage system has the RAM further segmented into a mirroring cache and the primary storage system has a log-structured disk as a secondary level cache for mirroring, replication, disk-to-disk backup, archiving, or ILM.

8. A storage architecture as recited in claim 7, wherein the RAM and the log-structured disk form a two level hierarchical cache that caches data or delta-parity if computed, wherein the cached data and the delta-parity in the two level hierarchical cache are to be replicated, backed up, or archived to the secondary storage system.

9. A storage architecture as recited in claim 7, wherein upon each write operation, the RAM collects a written data block or a delta-parity of the written data block if the delta-parity is computed contemporaneously to form a large log to be sequentially written into the log-structured disk.

10. A storage architecture as recited in claim 9, wherein the large log contains a number of entries, each entry being either a data block with associated meta-information, a delta-parity of a data block with associated meta-information, a flag in each log entry indicating whether the log entry is a data block or a delta-parity and a header with meta-information about the large log.

11. A system for storing data in a network comprising:

first means for calculating a delta_parity at a primary storage system;

second means for caching the delta_parity and data at the primary storage system;

third means for transmitting the delta_parity; and a secondary storage system for receiving the delta_parity, the secondary storage system being operative to perform the step of computing parity based upon the delta_parity, wherein the secondary storage system being operative to perform the following step of deriving new data based upon the computed parity and data present at the secondary storage system.

12. A system as recited in claim 11, wherein the first means is a parity computation engine, the second means is a two level cache hierarchy, and the third means is limited bandwidth communication line.

13. A system as recited in claim 11, further comprising the step of determining if a cache hit has occurred.

14. A system as recited in claim 11, further comprising the step of applying data compression to the delta_parity.

15. A system as recited in claim 11, wherein the secondary storage system is further operative to perform the following steps:

reorganize logs of data and delta_parities in time sequence for each LBA;

store the logs in storage selected from the group consisting of a disk, RAID, and tapes;

use logical block addressing to index a log upon retrieval;

sequentially read the log;

find a location in the log based upon a time entry; and recompute data based upon the delta_parity and data.

* * * * *